April 15, 1952      J. P. WOODS      2,592,780

SEISMIC METHOD AND APPARATUS

Filed June 18, 1947      3 Sheets-Sheet 1

ATTEST
Robert J. Staples

INVENTOR.
John P. Woods
BY Norbert E. Birch
Attorney

April 15, 1952   J. P. WOODS   2,592,780
SEISMIC METHOD AND APPARATUS
Filed June 18, 1947   3 Sheets-Sheet 2

ATTEST
Robert J. Staples

INVENTOR.
John P Woods
BY Norbert E Birch
Attorney

April 15, 1952 — J. P. WOODS — 2,592,780
SEISMIC METHOD AND APPARATUS
Filed June 18, 1947 — 3 Sheets-Sheet 3
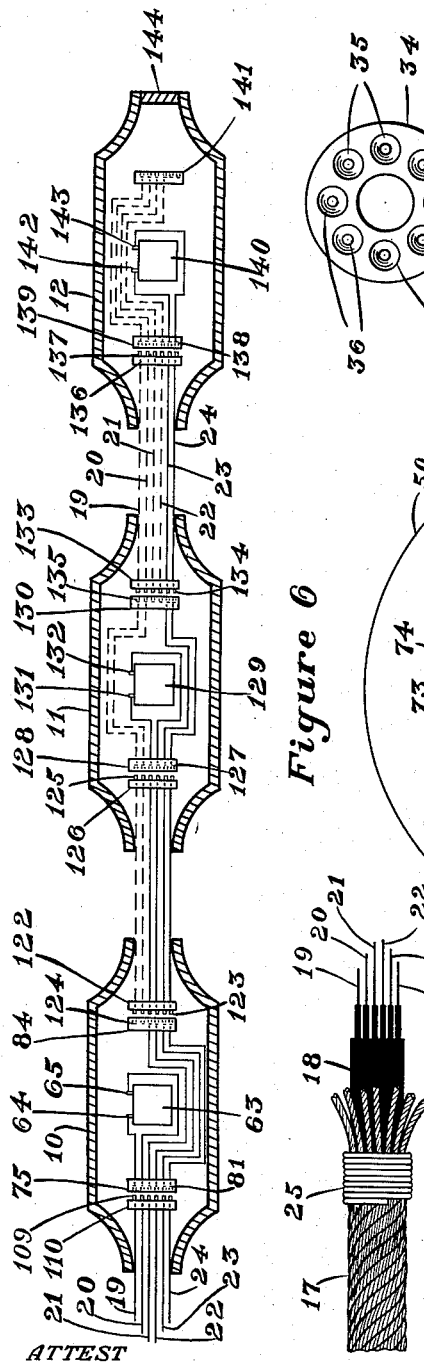
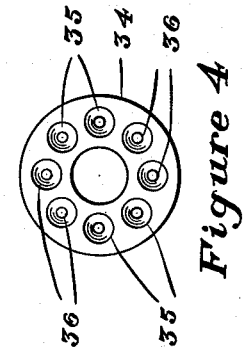
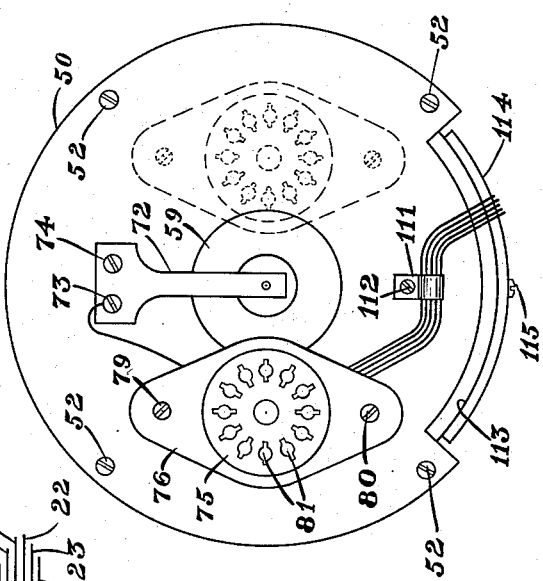
INVENTOR.
John P. Woods
BY Norbert E. Birch
Attorney
ATTEST
Robert I. Staples

Patented Apr. 15, 1952

2,592,780

UNITED STATES PATENT OFFICE 2,592,780

SEISMIC METHOD AND APPARATUS

John P. Woods, Dallas, Tex., assignor to The Atlantic Refining Company, Philadelphia, Pa., a corporation of Pennsylvania Application June 18, 1947, Serial No. 755,410

5 Claims. (Cl. 177—352)

The invention relates to improvements in seismic exploration and, more particularly, to improvements in method and apparatus useful in underwater seismic exploration.

The technique of seismic exploration has been largely evolved as a result of the continuous search for petroleum. As is well known, the ordinary method consists in generating seismic waves at certain points, commonly designated as "shot points," such waves being received by instruments known as seismometers, geophones, or jugs, at various other points and recorded in such a manner that the travel time between the "shot point" and point of reception will give an indication of the depth and nature of the tectonic formations through which such waves have passed. It will readily be understood that, when such exploration is carried out on land, no particular difficulty is experienced in placing the seismometers nor in moving same from point to point throughout an area.

As a result, however, of the approaching exhaustion of land areas favorable to the location of petroleum deposits, it has become more and more necessary to turn to those areas which are covered by large bodies of relatively shallow water such as, for example, certain areas overlain by the Gulf of Mexico, such areas seeming to offer sufficient promise of petroleum deposits to warrant careful exploration. From the very nature of underwater exploration, however, as opposed to comparable seismic methods used on land, certain problems have arisen which have not, hitherto, successfully been solved.

The greatest difficulty has been encountered in attempting to place the seismometers on the underwater terrain in an upright position and in substantially an "in-line" spread. Conventionally, this has been done by planting each seismometer of a spread by hand from a small boat, such seismometers having spikes or grates which tend to keep them in an upright position. After each shot, the spread is then taken up and moved to the next reception point. Although this procedure has proved fairly satisfactory in planting the seismometers in the desired position, it is slow, difficult, and uneconomical.

Another method, and one which has solved the problem insofar as speed of planting and moving the seismometers, and resultant economy are concerned, has been to tow the seismometer string behind the boat, such string falling to the bottom when the tension on the towing cable falls below a critical valve. Hydraulic kites adapted to guide the fall are provided on each seismometer. Even though such kites function efficiently, however, to carry the seismometers to the bottom in an upright position, irregularities in the bottom often cause the seismometers to fall on their sides, such seismometers, as a result, either failing completely to receive, or incompletely receiving the seismic waves subsequently generated. Furthermore, an additional factor in producing inaccurate results is that the seismometer spread, trailing for a great distance behind the boat, is often carried out of line by wind and current. Then, too, there is the ever present danger that the long spread will foul or hinder other water borne traffic.

An object of the invention, therefore, is to provide a method and apparatus for underwater seismic exploration which will function efficiently regardless of wind, currents, or topographical conditions of the underwater terrain.

Another object of the invention is to provide apparatus for underwater seismic exploration which can readily be brought to the desired reception point and quickly moved from point to point as desired.

A further object of the invention is to provide a method of underwater seismic exploration which can be easily carried out and which will give accurate results under all conditions.

Other objects of the invention will be apparent from the description and claims which follow.

In the drawing like numerals are used to designate like elements.

Figure 3 is an elevational view of the cable designated 14 in Figure 1 with portions broken away for purposes of clarity.

Figure 4 is a rear elevational view of the tension wire retainer designated as 34 in Figure 2.

Figure 5 is a front elevational view taken along the lines 5—5 in Figure 2.

Figure 6 is a schematic view showing the electrical connections between the several jug torpedoes designated 10, 11, and 12, in Figure 1.

Figure 1:
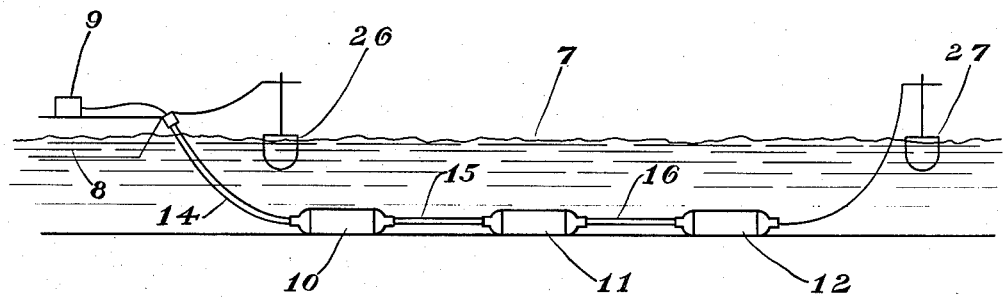
Figure 1 is a schematic view of the apparatus in operative position.

Referring now to the drawing, specifically Figure 1, 7 represents a body of water. A boat 8 carries recording means 9 and is adapted to tow the jug torpedoes, designated generally as 10, 11, and 12 along underwater terrain or water bed 13.

It should be understood that, for purposes of simplicity and clarity, only three jug torpedoes have been shown. In actual practice of the invention, any number of torpedoes required to accomplish a specific seismic mission can be used, such torpedoes extending in an "in-line" spread for relatively great distances rearward of boat 8. The distance between the torpedoes is usually of the order of 100 feet, although greater or smaller distances may be used, if desired.

Jug torpedo 10 is attached to boat 8 by means of towing or drag cable 14, jug torpedo 11 to jug torpedo 10 by cable 15, and jug torpedo 12 to jug torpedo 11 by cable 16. Cables 14, 15, and 16 are identical, being composed of (Figure 3) armored cover 17, insulating sheath 18, and electrical conductors 19, 20, 21, 22, 23, and 24. Cable cover retainer 25, such as a wire wrapping, is provided to prevent the unraveling of armored cover 17 comprising a plurality of multi-wire strands, to a greater extent than desired. As a spread of only three torpedoes is here described, only six electrical conductors are shown, it being understood in any case, that the actual number of such conductors provided is sufficient to permit the use of any necessary number of torpedoes foreseeable under ordinary conditions, each seismometer requiring two conductors. It will be noted that, complete interchangeability of parts being a feature of the invention, cables containing more than the required number of conductors can be used, even though two or more wires may be inactive in any given operation.

As shown in Figure 1, cable 14 is attached to boat 8 by suitable means, armored cover 17 being then broken away and the remainder of the cable being extended to recording means 9, at which point insulating sheath 18 is stripped from the electrical conductors and such conductors connected to the recording means. Buoys 26 and 27, respectively, are provided at the ends of the torpedo spread to give an indication of the location of such spread in the event of accidental disconnection or breakage of cables 14, 15, or 16.

Figure 2:
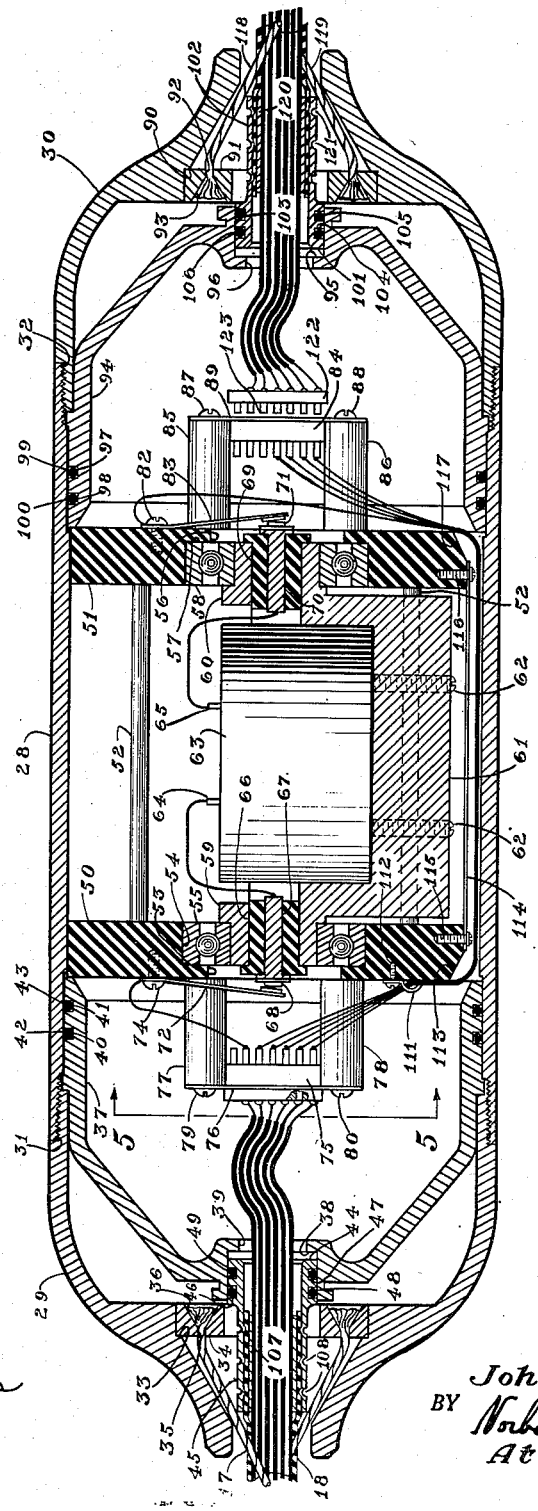
Figure 2 is a view, partially in cross section, of the jug torpedo which forms a portion of the invention.

In Figure 2 is shown a view, partially in cross section, of a jug torpedo such as is designated 10, 11 or 12 in Figure 1. The torpedo is essentially a tapered watertight casing having a body portion 28 with identically shaped tapered ends 29 and 30, respectively, detachably affixed thereto as by threads 31 and 32, respectively, or by other suitable means, thereby to adapt the casing for drag movement in the direction of its longitudinal axis along water bed 13.

Internal shoulder 33 on tapered end 29 provides a seat for tension wire retainer 34, the latter being formed with a plurality of holes 35 countersunk to a limited depth as at 36, the purpose of which holes will be described hereinafter. Slidably fitted within body portion 28 and extending into tapered end 29 is cylindrical housing 37, such housing being formed with a frustro-conical end recessed as at 38, said recess communicating with bore 39. Circumferential channels 40 and 41 are formed near the inner end of housing 37 and contain packing as indicated at 42 and 43, respectively. Slidably fitted within recess 38 of housing 37 is packing retainer ring 44 having elongated neck 45, the purpose of which will be described hereinafter. Packing retainer ring 44 is further provided with circumferential grooves 46 and 47 containing packing such as 48 and 49, respectively. Packing 42, 43, 48, and 49 may be of any waterproof, resilient material, and functions to prevent leakage of water into casing body 28.

Vertically disposed within body portion 28 is partition 50, such partition being formed of any suitable insulating material. An identical partition 51 is also disposed in body portion 28 and is spaced from but affixed to partition 50, by tie rods such as 52, or any other suitable means. This arrangement of partitions 50 and 51 and tie rods 52 provides a housing within the casing transversely of the longitudinal axis thereof, which housing is adapted to contain a seismometer. Partition 50 is apertured at 53, such aperture having an internal shoulder 54 to provide a seat for ball race 55. Partition 51 is identical with partition 50 as to aperture 56, shoulder 57, and ball race 58. Positioned within ball races 55 and 58 are hollow trunnions, 59 and 60 respectively, of cradle 61, such cradle having detachably affixed therein by means of bolts 62, or other suitable means, a seismometer, geophone or jug 63 having terminals 64 and 65. This construction permits free movement of the seismometer on an axis substantially parallel to the longitudinal axis of the casing and in a manner such that the seismometer will be maintained in a fixed, substantially vertical position relative to the longitudinal axis of the casing irrespective of the number of rotations of the casing on its longitudinal axis in either direction. Extending through trunnion 59 is hollow insulating bushing 66 containing an electrically conducting plug 67, the latter terminating at its outer extremity in contact button 68. A similar arrangement of bushing 69, plug 70, and contact button 71 extends through trunnion 60.

Associated with contact button 68 is brush 72 affixed to the outer side of partition 50 by screws 73 and 74, or by other suitable means. Electrical socket panel 75 is offset from partition 50 and held by plate 76 affixed to legs 77 and 78 by bolts 79 and 80, respectively. Socket panel 75 contains a plurality of plug receiving sockets 81, the purpose of which will be described hereinafter.

Affixed to the outer side of partition 51 by screws such as 82 and associated with contact button 71 is brush 83. Electrical socket panel 84, spaced from partition 51 by legs 85 and 86, plate 87 and bolts 88 and 89, is formed with a plurality of plug receiving sockets, the purpose of which will be described hereinafter.

The portion of the torpedo contained within tapered end 30 is identical with that portion contained within tapered end 29 and will be described only briefly to indicate what numerals refer to the various parts. 90 designates the internal shoulder or tapered end 30 in which is seated tension wire retainer 91 formed with holes 92 countersunk as at 93. Cylindrical housing 94 is fitted within body portion 28, the frustro-conical end of said housing extending into tapered end 30 and being recessed as at 95, said recess communicating with bore 96. Circumferential channels 97 and 98 containing packing 99 and 100 are provided on housing 94. Within recess 95 of housing 94 is positioned packing retainer ring 101 having elongated neck 102, and circumferential grooves 103 and 104 containing packing 105 and 106, respectively.

One of the features of the invention is the manner in which the seismometer within each torpedo is connected by an independent circuit to recording means 9, each torpedo still retaining its interchangeability with any other torpedo. This feature is described with reference to Figure 2 and Figure 6. As shown in the former figure, cable 14 is introduced into torpedo 10 through the opening in the end thereof. Armored cover 17 is unwound a limited distance, its component wires being then introduced into holes 35 in tension wire retainer 34 and brazed or otherwise secured within the countersunk portion of such holes, whereby said wires and said tension wire retainer are adapted to bear the tension applied to cable 14 by reason of the movement of boat 8 and the weight of the various torpedoes. Insulating sheath 18 of cable 14 is loosened from the electrical conductors contained therein and sleeve 107 slipped between sheath 18 and said conductors. Insulating sheath 18, sleeve 107, and the electrical conductors are inserted into packing retainer ring 44, the elongated neck 45 of the retainer ring then being tightly crimped over sheath 18 as at 108. The ends of the conductors protruding through bore 39 are suitably connected to prongs 109 carried by plug 110, which prongs are inserted in the corresponding receiving sockets 81 provided in the socket panel 75.

The electrical conductors contained within cable 14 have hereinbefore been designated as 19, 20, 21, 22, 23 and 24. By termination of such conductors at prongs 109 on plug 110, and completion of the circuits by various lead wires in torpedoes 10, 11 and 12, and cables 15 and 16, complete interchangeability of such torpedoes and cables is insured. For purposes of clarity and simplicity in tracing the various circuits, the same numerals will be used throughout to designate like wires throughout a circuit even though such wires may actually be composed of separate lengths operably connected.

By reference to Figures 2 and 6, it is apparent that conductor 19 is connected through socket panel 75 to brush 72, the latter being in electrical contact with contact button 68. From said button, electrical connection is made through plug 67 in bushing 66 to terminal 64 on seismometer 63. Remaining electrical conductors 20, 21, 22, 23, and 24 are carried downward from socket panel 75, and through clip 111 fastened to partition 50 by screw 112, or other suitable means. Partition 50 is cut away as at 113 to permit the passage of said conductors thereunder. Plate 114 is affixed to the under side of partition 50 by bolt 115 and to the under side of partition 51 by bolt 116. The conductors are led under plate 114, such plate preventing said conductors from interfering with the free movement of cradle 61. Partition 51 is cut away as at 117 to permit the emergence of said conductors from under plate 114, conductors 21, 22, 23, and 24 being then connected directly into socket panel 84. Conductor 20 is connected to brush 83, the latter being in electrical contact with contact button 71, from which button, electrical connection is made through plug 70 in bushing 69 to terminal 65 of seismometer 63. Thus the first circuit is composed of conductor 19, seismometer 63, conductor 20, and recording means 9.

One end of cable 15 is inserted into tapered end 30 of torpedo 10. Armored cover 118 on said cable is unwound and the ends thereof inserted into holes 92 of tension wire retainer 91 and affixed within the countersunk portion of said holes by brazing, or other suitable means. Insulating sheath 119 is loosened from the electrical conductors and sleeve 120 is inserted between sheath 119 and said conductors. Elongated neck 102 of packing retainer ring is slipped over sheath 119, sleeve 120, and the electrical conductors, and crimped thereon as at 121.

Plug 122 is connected to socket panel 84, prongs 123 of said plug being received within plug receiving sockets 124 provided in said panel. Cable 15, as can be seen by reference to Figure 2, is identical with cable 14 to achieve complete interchangeability of such cables. It is apparent, however, that conductors 19 and 20 will now be inactive as this circuit has terminated at the seismometer in torpedo 10, such inactivity having no effect on the other conductors nor on the circuits to be described with relation to torpedoes 11 and 12. Such circuits will be described solely with reference to Figure 6 wherein a diagrammatic showing is made, it being understood that all apparatus is identical with that shown in Figure 2 and that the method of attaching cables 15 and 16 within torpedoes 11 and 12 is identical with the attachment of cables 14 and 15 to torpedo 10.

Prongs 125 of plug 126 are inserted into plug receiving sockets 127 of socket panel 128 within torpedo 11. Conductors 19, 20, 23, and 24 bypass seismometer 129 and are connected directly to socket panel 130. Conductor 21 is connected to terminal 131 and conductor 22 is connected to terminal 132 of seismometer 129, whereby a second circuit including conductor 21, seismometer 129, conductor 22, and recording means 9 is formed.

The electrical conductors contained within cable 16 are provided at one end thereof with plug 133 bearing prongs 134 which are inserted into plug receiving sockets 135 of socket panel 130. It will be noted that, due to the previous formation of two circuits, conductors 19, 20, 21, and 22 are now inactive as indicated by dotted lines.

The electrical conductors contained within the other end of cable 16 carry plug 136 and prongs 137 which are inserted into plug receiving sockets 138 of socket panel 139 within torpedo 12. Inactive conductors 19, 20, 21 and 22 bypass seismometer 140 and are connected to socket panel 141. Conductor 23 is connected to terminal 142 and conductor 24 is connected to terminal 143 of seismometer 140, whereby a circuit including conductor 23, seismometer 140, conductor 24, and recording means 9 is formed.

Since torpedo 12 is the last of the spread which has been shown and described, plug 144 is sweated or otherwise removably positioned within the opening at the rear of torpedo 12 to prevent the entrance of water in such torpedo.

The operation of the apparatus is as follows:

The torpedo spread is paid out from boat 8, it being immaterial whether or not said boat is in motion. The boat then proceeds to the desired reception point, dragging the torpedo spread along the underwater terrain, at which point forward motion is arrested. The torpedoes are now in a straight line on the bottom, the seismometer in each torpedo being in a vertical position in relation to said underwater terrain, due to the suspension thereof in its respective cradle. Furthermore, due to the length of each torpedo together with the longitudinal pull of the cables, the chance that such torpedoes will be tilted lengthwise, as by a rock or slope is quite remote.

The circuits connecting recording means 9 with seismometers 63, 129 and 140, in torpedoes 10, 11 and 12, respectively, are energized, and seismic waves generated by any suitable means (not shown). For example, a charge of dynamite may be set off at a point any suitable distance from the torpedo line, and at any suitable location in relation thereto. Such waves are received by the various seismometers and, by virtue of the electric circuits are transmitted to, and recorded by recording means 9. After de-energizing the various circuits, boat 8, dragging the torpedo spread, proceeds to the next reception point and the procedure is repeated.

Although, as has hereinbefore been stated, cables 14, 15, and 16 have been shown as containing six conductors, and a spread of but three torpedoes has been shown, the invention is not restricted thereto. Such cables can be made with any desired number of conductors, limited only by the fact that there must be at least two conductors for each torpedo in the spread. If more conductors are used than can be accommodated by the corresponding plug receiving sockets in the various socket panels, additional socket panels can be furnished as shown by the dotted lines in Figure 5.

The examples here given and the particular description set forth are merely presented in order to illustrate how the invention may be applied. Other forms and variations coming within the scope of the appended claims will readily suggest themselves to those skilled in the art.

I claim:

1. Underwater drag seismometer means comprising a watertight casing adaptable for drag movement in the direction of its longitudinal axis along a water bed, end-structures forming with said casing a watertight housing within the casing transversely of the longitudinal axis thereof, a seismometer, cradle means rotatably mounting the seismometer within the housing for free movement on an axis substantially parallel to the longitudinal axis of the casing, multi-terminal electrical socket means disposed inwardly of said end-structures at each end of said casing, a plurality of electrical conductors extending through said casing and connecting terminals of said electrical socket means at one end to corresponding terminals of the electrical socket means at the other end, and means connecting said seismometer to a selected pair of terminals of said electrical socket means.

2. Underwater drag seismometer means comprising a watertight casing adaptable for drag movement in the direction of its longitudinal axis along a water bed, a housing within the casing transversely of the longitudinal axis thereof, a seismometer, cradle means rotatably mounting the seismometer within the housing for free movement on an axis substantially parallel to the longitudinal axis of the casing and in a manner such that the seismometer will be maintained in a fixed, substantially vertical position relative to the longitudinal axis of the casing irrespective of the number of rotations of the casing on its longitudinal axis in either direction, electrical conductor means connecting independently each of the terminals of the seismometer and providing contacts exteriorly of the housing, contacting means secured to the exterior of the housing and in frictional engagement with each of the contacts, electrical conductor means provided within the casing and extending exteriorly thereof, a plate, support means attached to the housing for supporting the plate within the casing and exteriorly of the housing, and electrical socket means mounted on the plate for connecting the contacting means to the last mentioned electrical conductor means.

3. Underwater drag seismometer means comprising a watertight casing adaptable for drag movement in the direction of its longitudinal axis along a water bed, a housing within the casing transversely of the longitudinal axis thereof, a seismometer, cradle means rotatably mounting the seismometer within the housing for free movement on an axis substantially parallel to the longitudinal axis of the casing and in a manner such that the seismometer will be maintained in a fixed, substantially vertical position relative to the longitudinal axis of the casing irrespective of the number of rotations of the casing on its longitudinal axis in either direction, electrical conducting plug means rigidly mounted in the cradle in a manner such that the plug means will be electrically insulated therefrom and will extend exteriorly of the housing, electrical conductor means connecting independently each of the terminals of the seismometer to the plug means, contacting means secured to the exterior of the housing and in frictional engagement with the plug means, electrical conductor means provided within the casing and extending exteriorly thereof, a plate, support means attached to the housing for supporting the plate within the casing and exteriorly of the housing, and electrical socket means mounted on the plate for connecting the contacting means to the last mentioned electrical conductor means.

4. Underwater drag seismometer means comprising a casing adaptable for drag movement in the direction of its longitudinal axis along a water bed, a seismometer, cradle means rotatably mounting the seismometer within the casing for free movement on an axis substantially parallel to the longitudinal axis of the casing and in a manner such that the seismometer will be maintained in a fixed, substantially vertical position relative to the longitudinal axis of the casing irrespective of the number of rotations of the casing on its longitudinal axis in either direction, end-structures forming with said casing a watertight enclosure for said cradle and seismometer, electrically conducting plug means rigidly mounted in said cradle means at the axis of rotation thereof and electrically insulated therefrom, electrical conductor means connecting independently each of the terminals of the seismometer to said plug means, contacting means in frictional engagement with the plug means, a plate, support means attached to said casing for supporting the plate within said casing inwardly of said end-structures, electrical socket means mounted on said plate, additional electrical conductor means provided within said casing for interconnecting said contacting means and said socket means, and conductors extending exteriorly of said casing, each being provided with plugs for engaging said socket means.

5. A seismic surveying apparatus capable of being dragged by one end thereof comprising in combination a plurality of cable sections each including a tension-bearing member and a plurality of conductors, end-members having openings therethrough, each end of said tension-bearing member of each cable section being rigidly secured to one of said end-members with said conductors of said cable section extending through the opening of said one end-member, multi-terminal electrical plug means secured to each end of said cable sections by having the conductors of said cable sections attached respectively to terminals of said plug means, a plurality of casings containing seismometers, which casings are respectively disposed between adjacent cable sections and thereby spaced one from the other, each end of each of said casings having end structure engageable by said end-members of each cable section to form a mechanical connection between the adjacent tension-bearing member and casing, each end of each of said casings also having multi-terminal electrical socket means disposed inwardly of said end-structure and engageable by said plug means of each cable section to form an electrical connection between said plug and socket means, conductors within each of said casings electrically interconnecting the respective terminals of the multi-terminal electrical socket means at each end thereof, and a pair of conductors within each casing connected to the seismometer therein and to a selected pair of terminals of said multi-terminal socket means.

JOHN P. WOODS.

REFERENCES CITED

The following references are of record in the file of this patent:

UNITED STATES PATENTS

| Number | Name | Date |
|---|---|---|
| 2,019,497 | Kuntze | Nov. 5, 1935 |
| 2,021,330 | Ross et al. | Nov. 19, 1935 |
| 2,027,393 | McCreary | Jan. 14, 1936 |
| 2,241,428 | Silverman | May 13, 1941 |
| 2,283,200 | Flude | May 19, 1942 |
| 2,324,378 | Flude | July 13, 1943 |
| 2,407,697 | Williams | Sept. 17, 1946 |
| 2,410,805 | Black | Nov. 12, 1946 |

FOREIGN PATENTS

| Number | Country | Date |
|---|---|---|
| 606,063 | France | June 7, 1926 |